United States Patent [19]

Jacobs

[11] Patent Number: 4,620,745
[45] Date of Patent: Nov. 4, 1986

[54] VEHICLE BODY WHEEL OPENING STRUCTURE

[75] Inventor: William G. Jacobs, Bloomfield Hills, Mich.

[73] Assignee: General Motors Corporation, Detroit, Mich.

[21] Appl. No.: 779,109

[22] Filed: Sep. 23, 1985

[51] Int. Cl.[4] .................. B62D 25/16; B60R 13/02
[52] U.S. Cl. .................. 296/198; 52/718.1; 428/31
[58] Field of Search ............. 296/135, 187, 191, 198, 296/203; 280/153 A, 153 B, 153.5, 154.5 R; 52/716–718, 718.1; 428/31

[56] References Cited

U.S. PATENT DOCUMENTS 4,066,285  1/1978  Hall et al. ........................ 428/31
4,365,450  12/1982  Adell ............................. 52/716

FOREIGN PATENT DOCUMENTS 0021974  2/1981  Japan ............................. 296/191
0039967  4/1981  Japan ............................. 296/198
511210   8/1939  United Kingdom ................ 296/203
1001923  8/1965  United Kingdom ................ 296/198

Primary Examiner—Robert B. Reeves
Assistant Examiner—Dennis H. Pedder
Attorney, Agent, or Firm—Herbert Furman

[57] ABSTRACT

A vehicle body wheel opening structure includes a pinchweld structure defined by flanges of a body outer panel and a body wheelhouse member which are secured to each other and extend generally within the plane of the opening. The edge of the pinchweld structure defines a body wheel opening. A generally U-shaped molding clamps to the pinchweld structure and is retained against any movement downwardly of the wheel opening by closure members which close the open lower ends of the molding and are secured to flanges of the outer panel.

1 Claim, 4 Drawing Figures

VEHICLE BODY WHEEL OPENING STRUCTURE

This invention relates to a vehicle body wheel opening structure and more particularly to such a structure which provides both a wheel opening and a molding for concealing the edge portion of such wheel opening.

In current and past production vehicle bodies, it is conventional to spot weld an inwardly extending flange of the vehicle body rear quarter outer body panel member to a like flange of the body wheelhouse member to provide an inwardly extending pinchweld structure which defines a U-shape rear wheel opening. Conventionally, an L-shaped molding has one leg abutting the outer surface of the outer panel and the other leg abutting the pinchweld structure and being secured thereto by sheet metal screws.

The wheel opening structure of this invention includes a body rear wheel opening which is defined by a terminal flange of the rear quarter outer body panel member and a like flange of the wheelhouse member, both of which extend generally within the plane of the rear wheel opening, defined by the edges thereof. These flanges abut and are welded to each other to provide the pinchweld structure. The terminal flanges are joined to their respective members across juncture flanges which define shoulders located both inwardly and outwardly of the wheel opening.

The molding for this structure is generally of U-shape and includes an outer leg having a return bent terminal flange which abuts the outer side of the pinchweld structure adjacent the juncture flange of the outer panel and an inner leg which abuts the inner side of the pinchweld structure adjacent the juncture flange of the wheelhouse member to thereby resiliently clamp the pinchweld structure between the legs of the molding. The open ends of the molding at the lower ends of the wheel opening receive plug portions of endcaps. The plug portions are secured to the molding by staking or otherwise. The end caps include flanges which abut against the lower laterally extending flanges of the body panel member and are secured thereto.

The primary feature of this invention is that it provides an improved vehicle body wheel opening structure including a wheel opening defined by a pinchweld structure extending within the general plane of the opening and mounting a wheel opening molding. Another feature is that it provides such a structure wherein the pinchweld structure is defined by terminal flanges of an outer body panel member and a wheelhouse member, with these flanges being joined to their respective members across juncture flanges, and with the molding having legs which engage the pinchweld structure adjacent such flanges to mount the molding to the pinchweld structure. A further feature is that the open ends of the molding are closed by closure members which are mounted to flanges of the body panel member adjacent the lower corners or ends of the wheel opening.

These and other features will be readily apparent from the following specification and drawings wherein.

Figure 1:
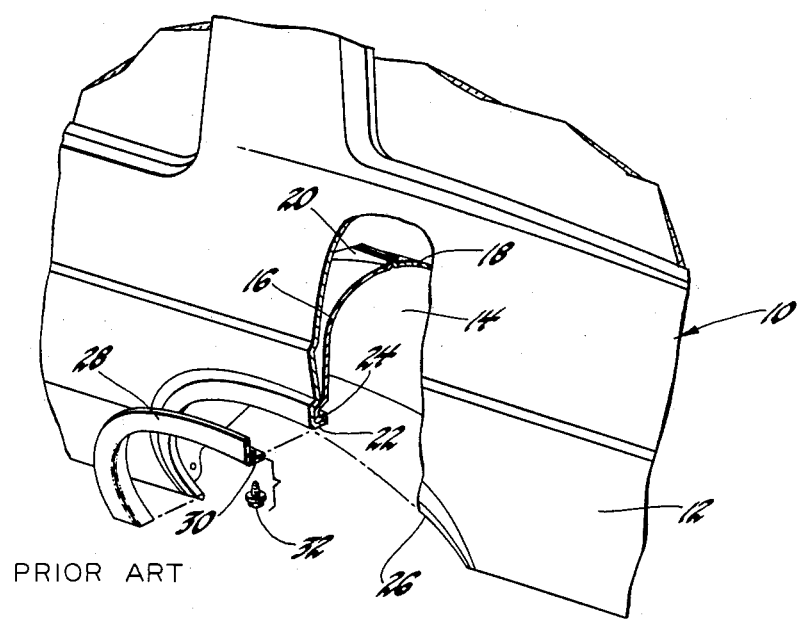
FIG. 1 is a partial cutaway perspective view of a vehicle body having a prior art wheel opening structure.

Referring now to FIG. 1 of the drawings, a vehicle body designated generally 10 includes a rear quarter outer body panel member 12 and a body rear wheelhouse structure 14 which includes a wheelhouse outer member 16 and a wheelhouse inner member 18 which are joined to each other across a pinchweld flange 20. The panel member 12 includes an inwardly extending terminal flange 22 of U-shape which mates with and is secured to a like shaped flange 24 of the member 16 to provide a laterally inwardly extending pinchweld flange which defines the rear wheel opening 26 of the body 10. A molding 28 overlies the panel member 12 around the opening 26, with this molding including a leg 30 which abuts against the flange 22 and is secured thereto by self-tapping screws 32. The prior art structure of FIG. 1 is well known in the automobile industry.

Figure 2:
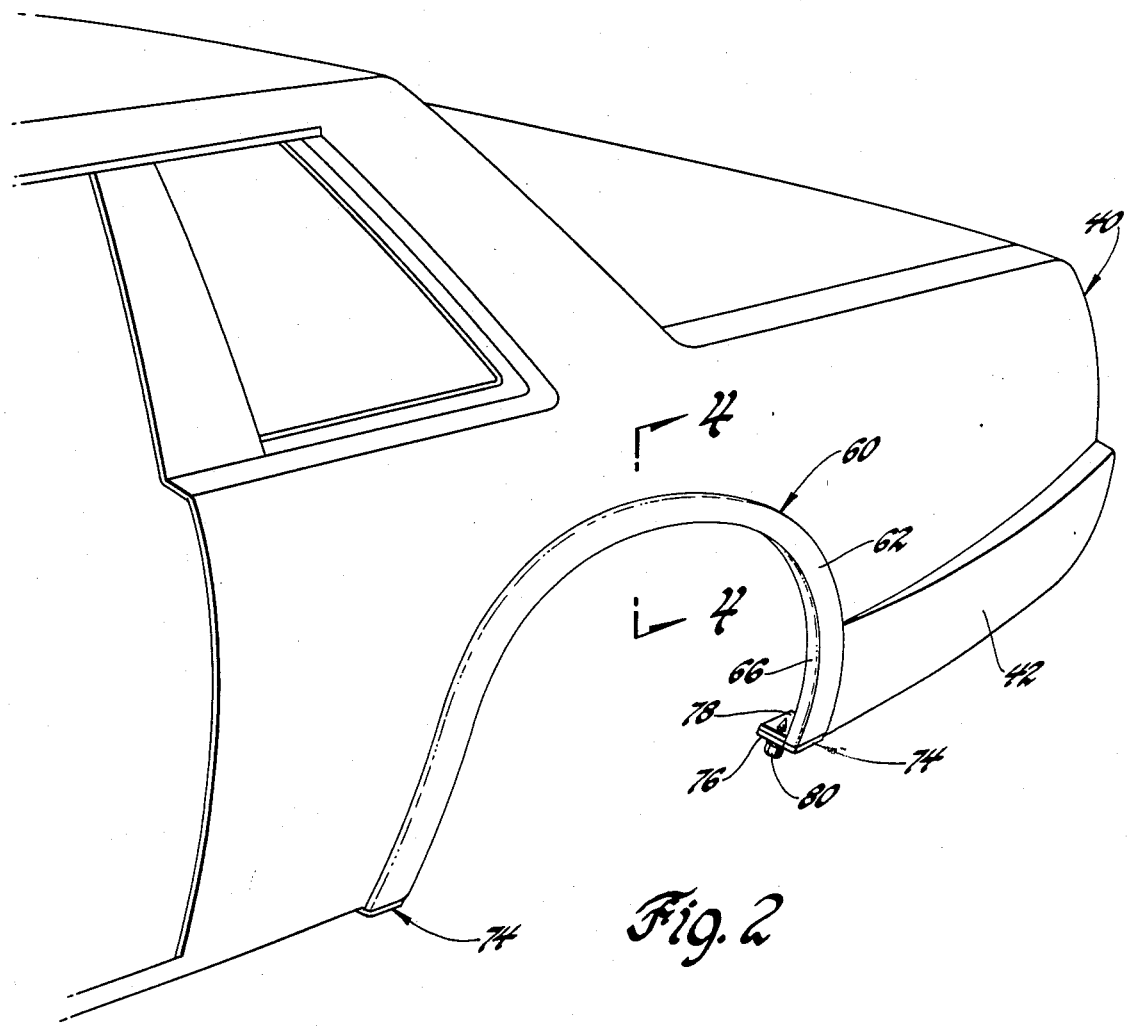
FIG. 2 is a partial perspective view of a vehicle body having the wheel opening structure of this invention.
Figure 3:
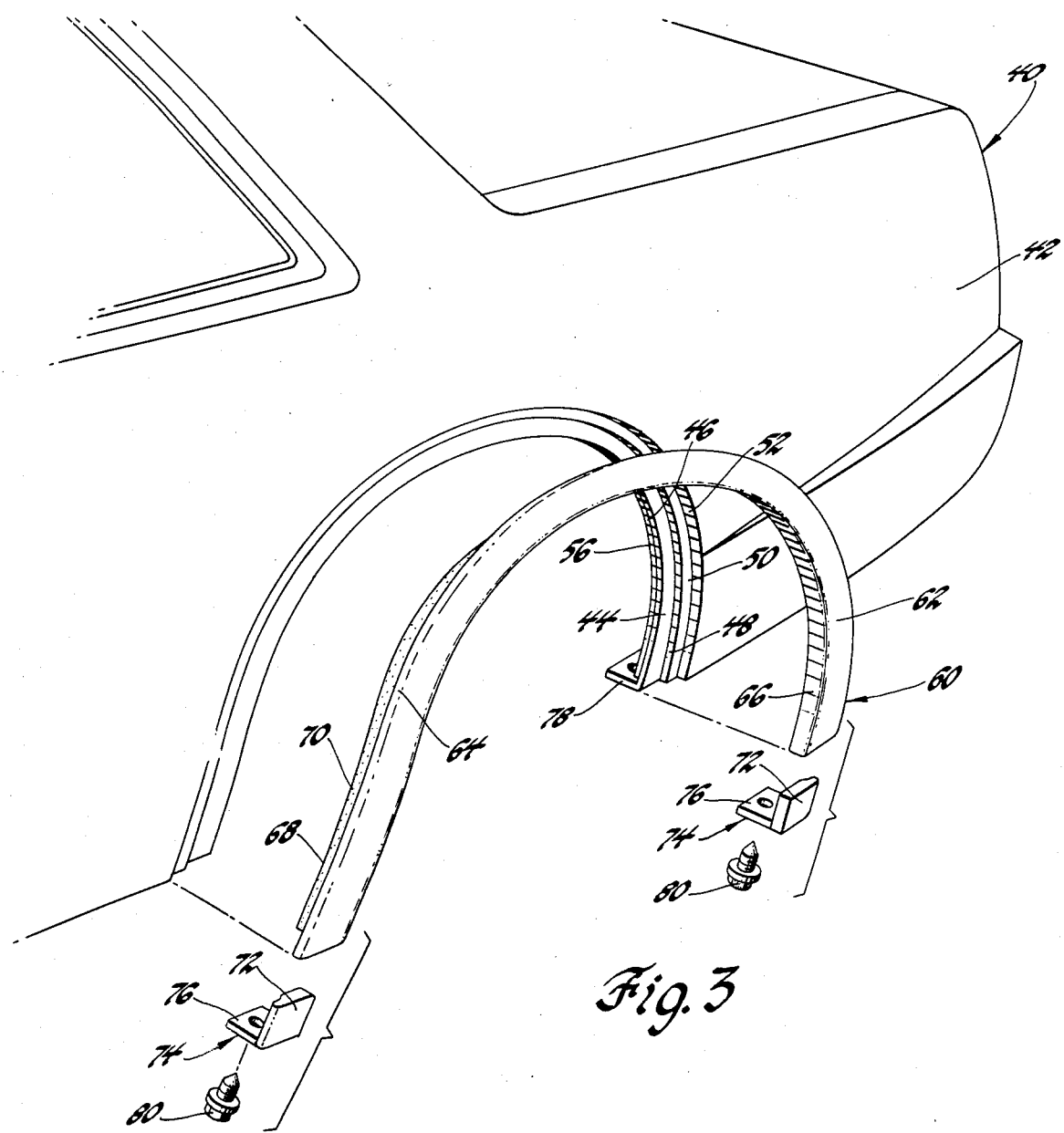
FIG. 3 is a blown apart perspective view of a portion of FIG. 2.
Figure 4:
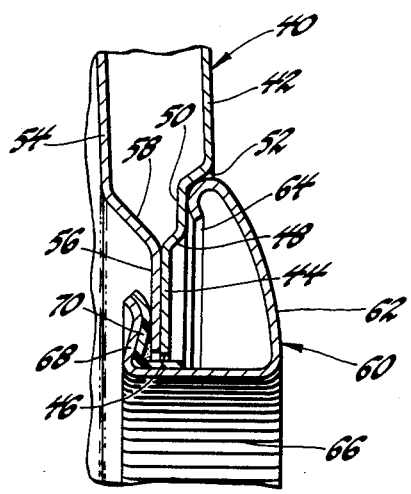
FIG. 4 is an enlarged sectional view taken along line 4—4 of FIG. 2.

FIGS. 2 through 4 of the drawings show the wheel opening structure of this invention. The body 40 includes a rear quarter outer body panel member 42 and a wheelhouse structure which includes inner and outer members as in the structure 14 shown in the prior art FIG. 1. The panel member 42 includes a terminal flange 44 which extends within the general plane of the rear wheel opening 46, defined by the edge thereof, rather than laterally to the plane of this wheel opening as in the prior art FIG. 1. The flange 44 is joined to the panel 42 across a series of integral angularly related juncture flanges 48, 50 and 52. The outer member 54 of the wheelhouse structure likewise includes a terminal flange 56 which extends generally within the plane of the wheel opening 46 defined by the edge thereof and abuts against and is secured to the flange 44 to define a pinchweld structure which defines the wheel opening 46. The flange 56 is joined to the wheelhouse member 54 across an angular juncture flange 58. Other than the difference in the pinchweld structure and the adjacent flanges, the remainder of the body 40 is conventional.

A generally U-shaped wheel opening molding 60 includes an outer leg 62 which overlies the flanges 44, 48 and 50 and has a return bent flange 64 which abuts flanges 50 and 52. The bight portion 66 of the molding is juxtaposed to the pinchweld structure and an inner arcuate leg 68 of the molding engages the flange 56 of the wheelhouse outer member 54. The leg 68 of the molding as well as a portion of the bight portion may be covered with semi-resilient material 70 for anti-rattle purposes. The resilient engagement of the legs 62 and 68 with the flanges 50 and 56 of the panel 42 and the wheelhouse outer member 54 resiliently mounts the molding 60 to the pinchweld structure defined by flanges 44 and 56. It can be seen that the mounting of the molding on the body structure is greatly improved over the prior art structure since all that need be done is to move the molding vertically upwardly within the wheel opening 46 rather than having to hold the molding in place and then inserting the screws which normally retain the molding to the flange. Further, the U-shaped molding 60 is made slightly open with respect to the opening 46 so that the legs of the molding exert opposite forward and rearward outward forces against the corresponding legs of the wheel opening for additional retaining effect.

The open lower ends of the molding 60 receive plug portions 72 of closure members or end caps 74. The end caps further include lateral apertured flanges 76 which abut against a lower laterally inwardly extending flange 78 of the panel 42, forwardly and rearwardly of the wheel opening, and are secured in place by screws 80.

It can be seen from the foregoing that the molding 60 can be very easily and quickly mounted on the body and can be easily thereafter fixed in place against any downward movement by the use of the closure members or end caps.

Thus this invention provides an improved vehicle body wheel opening structure.

The embodiments of the invention in which an exclusive property or privilege is claimed are defined as follows:

1. A vehicle body wheel opening structure comprising: a vehicle body outer panel member having a generally vertically extending terminal flange, the edge portion of which defines a generally U-shaped wheel outer opening, the terminal flange being offset inwardly of the outer body panel by at least one intermediate juncture flange extending angularly therebetween, a vehicle body wheelhouse member having a generally vertically extending terminal flange, the edge portion of which defines a wheel inner opening complementary in shape to that defined by the terminal flange of the outer panel, the terminal flange of the wheelhouse member being offset outwardly thereof by at least one intermediate juncture flange extending angularly therebetween, the terminal flanges of the body panel member and the wheelhouse member having their respective inner and outer sides abutting and joined to each other to provide a body pinchweld structure extending generally within a plane of the wheel opening defined by said edge portions, a wheel opening molding of U-shape having open ends, said molding including an outer leg overlying the outer side of the terminal flange of the outer body panel member, the outer leg including a return bent flange engaging a juncture flange of the outer body panel member, the molding further including a bight portion opposite said edge portions of said body panel member and said wheelhouse member, and an inner leg resiliently engaging the inner side of the wheelhouse member terminal flange, the inner and outer legs of the wheel opening molding clamping the molding to the body wheel opening structure, closure means closing said open ends of said molding and means securing said closure means to said body wheel opening structure.

* * * * *